United States Patent
Kawabe

(10) Patent No.: US 7,694,118 B2
(45) Date of Patent: Apr. 6, 2010

(54) FUNCTION ADDITION APPARATUS AND FUNCTION ADDITION METHOD

(75) Inventor: Shigeru Kawabe, Tokyo (JP)

(73) Assignee: NEC Personal Products, Ltd., Tokyo (JP)

( * ) Notice: Subject to any disclaimer, the term of this patent is extended or adjusted under 35 U.S.C. 154(b) by 716 days.

(21) Appl. No.: 11/360,519

(22) Filed: Feb. 24, 2006

(65) Prior Publication Data

US 2006/0195685 A1    Aug. 31, 2006

(30) Foreign Application Priority Data

Feb. 25, 2005    (JP)    ............... 2005-050998

(51) Int. Cl.
*G06F 9/00*    (2006.01)
(52) U.S. Cl. ............... 713/1; 713/2; 713/100
(58) Field of Classification Search .......... 713/1, 713/2, 100
See application file for complete search history.

(56) References Cited

U.S. PATENT DOCUMENTS

| | | |
|---|---|---|
| 6,003,131 A | 12/1999 | Lee et al. |
| 6,564,318 B1 | 5/2003 | Gharda et al. |
| 7,174,397 B2 | 2/2007 | Tomiyasu |

FOREIGN PATENT DOCUMENTS

| | | |
|---|---|---|
| JP | 10-083287 | 3/1998 |
| JP | 2001-142714 A | 5/2001 |
| JP | 2001-216132 A | 8/2001 |
| JP | 2002-073497 A | 3/2002 |
| JP | 2003-330726 A | 11/2003 |
| JP | 2004-264588 A | 9/2004 |

OTHER PUBLICATIONS

Tamura Masanobu, "PC/AT Compatible Personal Computer", Nov. 17, 1998, Japanese Publication 10-307714.*

* cited by examiner

*Primary Examiner*—Tse Chen
(74) *Attorney, Agent, or Firm*—Foley & Lardner LLP

(57) ABSTRACT

A function addition apparatus allows an added function to be started-up immediately after a computer has been powered on or reset. A function expansion program stored in a program storage section is called, before a start-up program starts-up an operating system, by the start-up program and is executed by the CPU. The functional expansion program controls a functional section. Under a first condition, the CPU is prevented from returning to execution of the start-up program after the function expansion program has been completed by the CPU. Under a second condition, the CPU is returned to execution of a start-up program after the function expansion program has been completed by the CPU so that the operating system is started-up. When the operating system is started-up after the CPU has returned to execution of the start-up program, the operating system or the like controls the functional section.

20 Claims, 4 Drawing Sheets

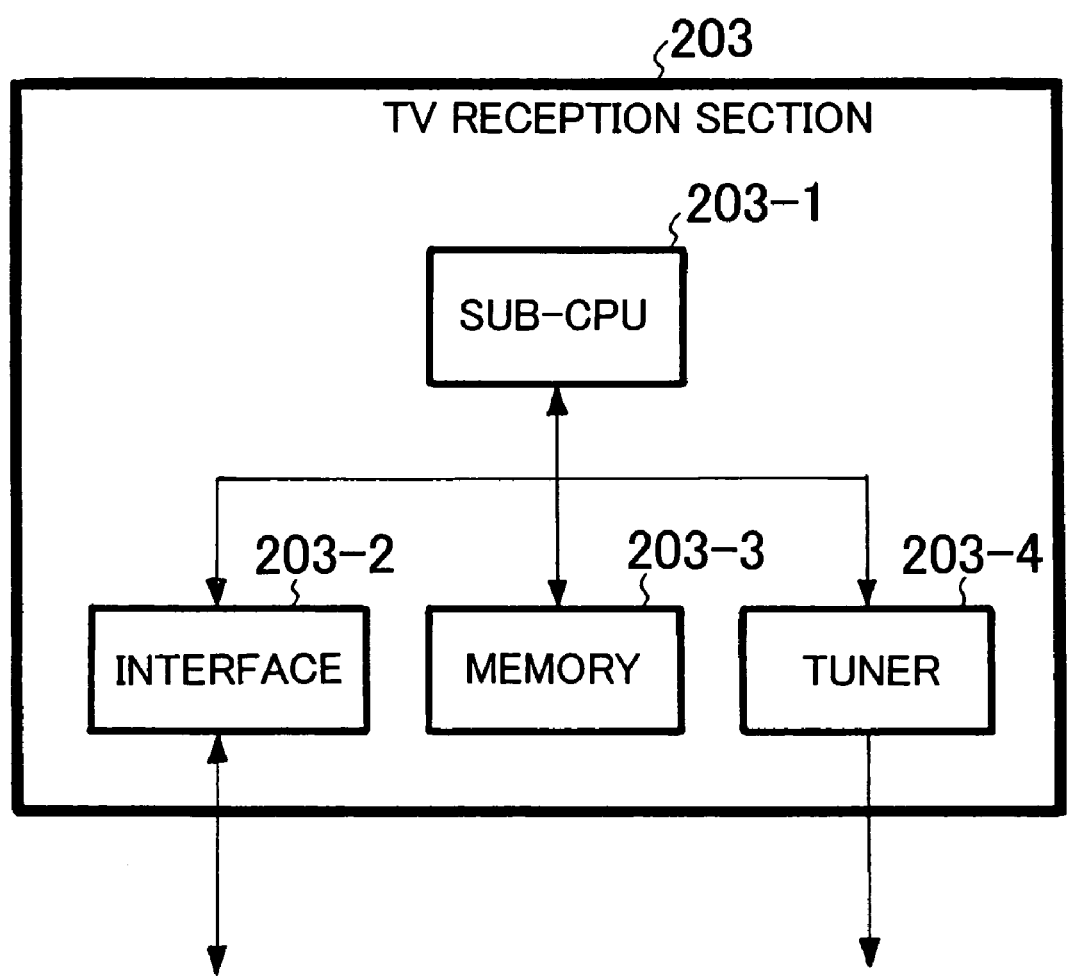

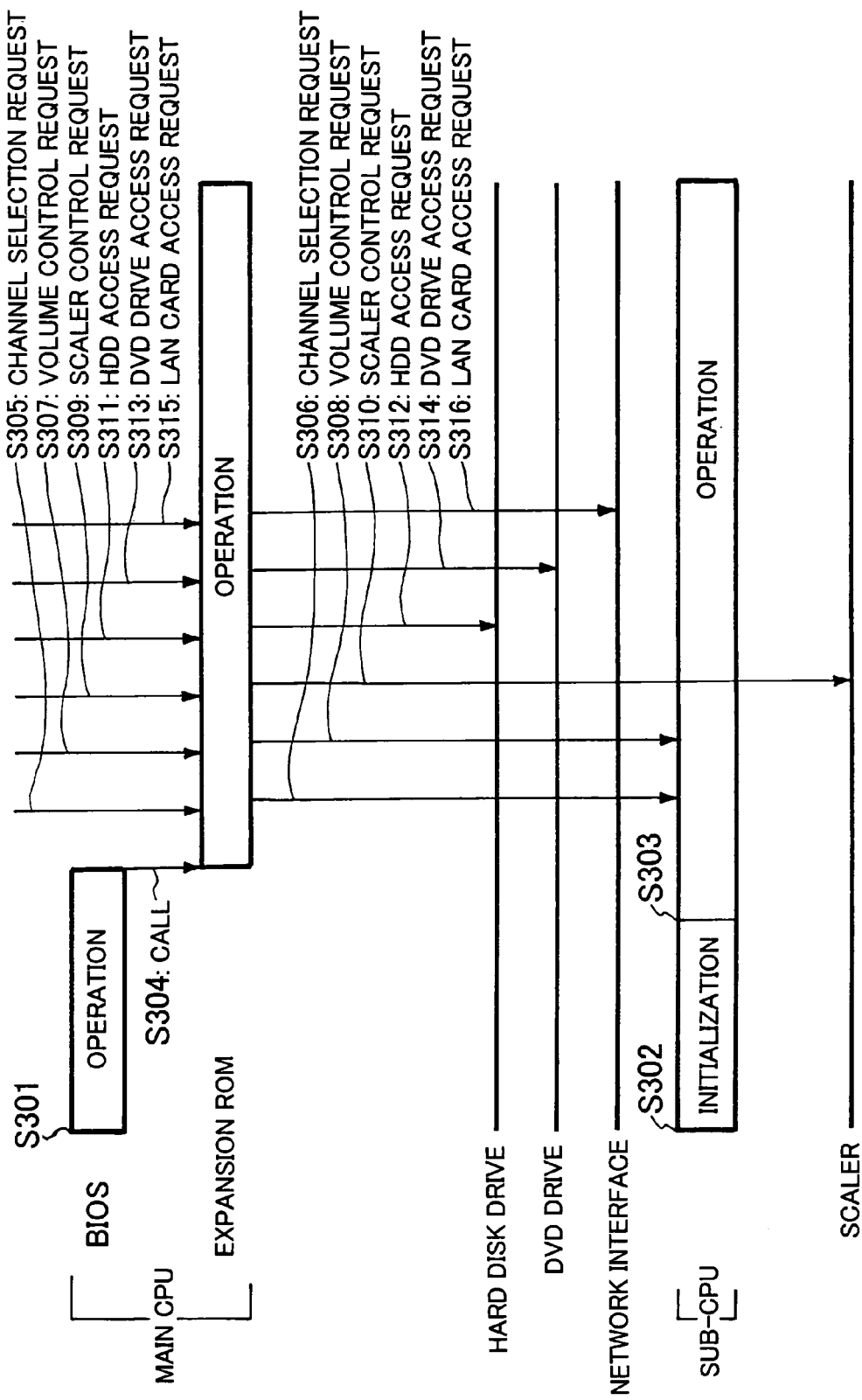

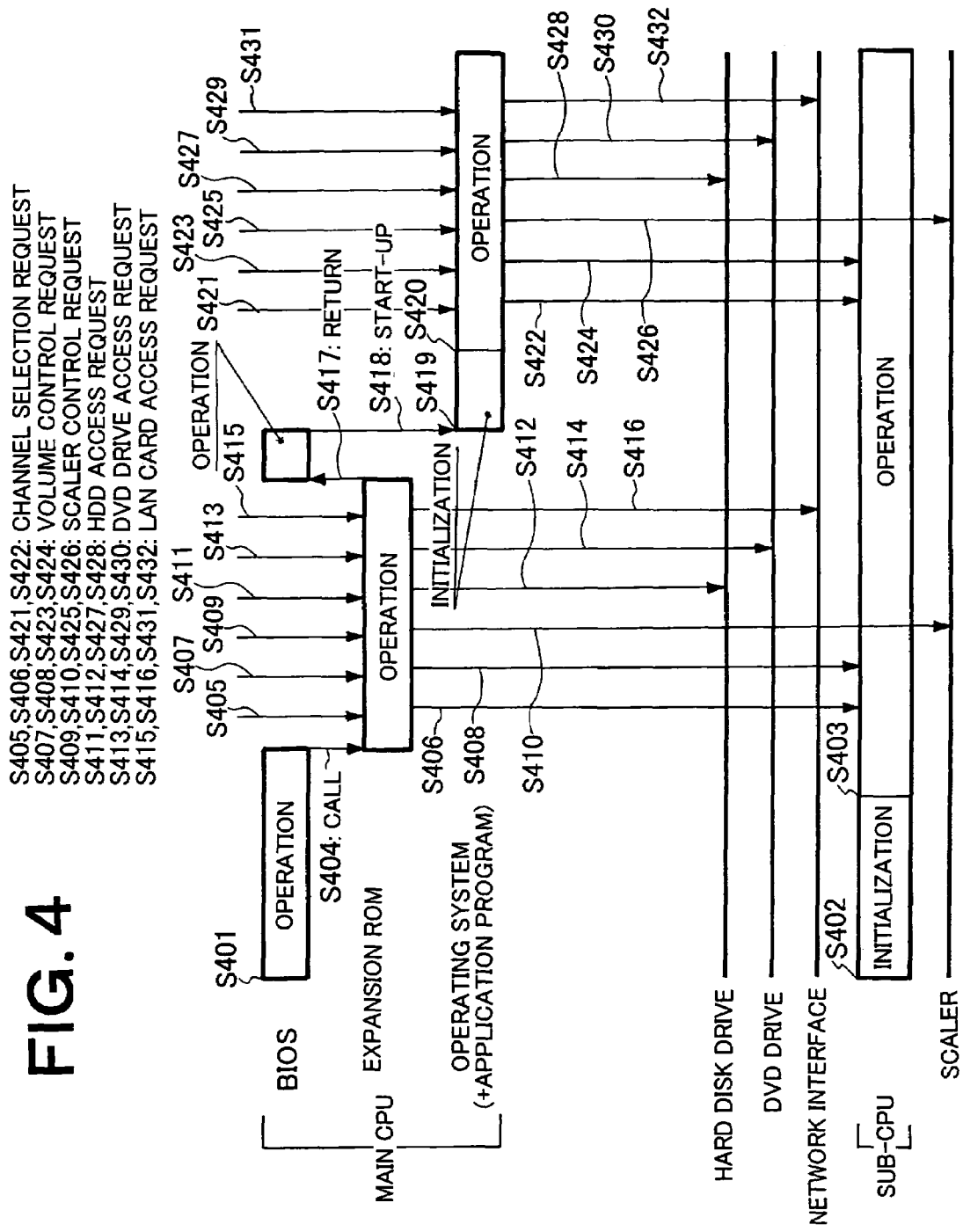

FUNCTION ADDITION APPARATUS AND FUNCTION ADDITION METHOD

BACKGROUND OF THE INVENTION

1. Field of the Invention

The present invention relates to a function addition apparatus and a function addition method for adding functions to a computer and, more particularly, to a function addition apparatus and a function addition method for adding a function to a computer before an operating system installed on the computer is started.

2. Description of the Related Art

In recent years, a personal computer allowing a user to enjoy TV programs and to record/reproduce them has emerged. Such a personal computer is provided with a TV tuner for receiving TV programs and a hard disk drive and a DVD (Digital Versatile Disc) drive for recording/reproducing TV programs.

Further, there is an invention that encrypts a hard disk drive in a personal computer and incorporates an encryption key and a program for decrypting the code into an expansion board to be inserted into an extension slot of the personal computer (refer to, for example, Jpn. Pat. Appln. Laid-Open Publication No. 2003-330726). According to the above invention, the code of the hard disk drive can be broken by the code-breaking program called by a BIOS (Basic Input/Output System) or an operating system when the extension board is inserted into the extension slot; whereas it is impossible to break the code of the hard disk drive in a state where the extension board is not inserted into the extension slot.

The above TV function of a personal computer becomes effective when an operating system or an application program that operates on the operating system controls the TV tuner, hard disk drive, and DVD drive after start-up of the operating system. However, the start-up of the operating system is normally completed after a good length (e.g., three minutes) of time has elapsed since the computer was powered on or reset. Therefore, it is impossible for a user to enjoy a TV program as soon as he or she switches on a computer, unlike the case of a normal TV set.

There is available a personal computer designed for solving the above program. This personal computer incorporates two TV tuners. One TV tuner can be operated through an operating system or an application program. The other TV tuner is configured as a stand-alone TV tuner. However, in such a personal computer, a TV program received by the stand-alone TV tuner cannot be recorded on a built-in or external hard disk drive or a DVD disc in a built-in or external DVD drive.

The above problem is also recognized in reception and recording/reproduction of radiobroadcast or reception and recording/reproduction of data.

SUMMARY OF THE INVENTION

An object of the present invention is provided a function addition apparatus and a function addition method capable of starting an added function immediately after a computer has been powered on or reset.

According to a first aspect of the present invention, there is provided a function addition apparatus that adds a function to a computer provided with a CPU, comprising: a program storage section that stores a function expansion program, the function expansion program is called, before a start-up program starts-up an operating system, by the start-up program executed at the start-up time of the computer and executed by the CPU; and a functional section to be subjected to be under control by the function expansion program executed by the CPU, wherein the control includes a control other than initialization.

In the above function addition apparatus, the function expansion program executed by the CPU not only controls the functional section but also may access to peripheral equipment.

In the above function addition apparatus, the function expansion program executed by the CPU not only controls the functional section but also may communicate with an external equipment through a network interface.

In the above function addition apparatus, the functional section may be controlled also by a program other than the function expansion program.

The above function addition apparatus may include means for preventing the CPU from returning to execution of the start-up program after the function expansion program has been completed by the CPU.

The above function addition apparatus may include means for returning the CPU to execution of the start-up program after the function expansion program has been completed by the CPU.

In the above function addition apparatus, the functional section may be controlled also by an operating system started-up after the CPU has returned to execution of a start-up program or an application program operating on the operating system.

In the above function addition apparatus, the functional section may include a sub-CPU. In this case, the sub-CPU may communicate with the CPU that executes the function expansion program.

In the above function addition apparatus, the functional section may be a TV reception section, a radio reception section, or a data reception section.

In the above function addition apparatus, the function addition apparatus may be a function expansion board that can be attached to a bus of the computer.

According to a second aspect of the present invention, there is provided a function addition apparatus that adds a function to a computer provided with a CPU, comprising: a program storage section that stores a function expansion program, the function expansion program is called, before a start-up program starts-up an operating system, by the start-up program executed at the start-up time of the computer and is executed by the CPU; a functional section to be subjected to a predetermined control by the function expansion program executed by the CPU; means for preventing the CPU from returning to execution of a start-up program after the function expansion program has been completed by the CPU under a first condition; and means for returning the CPU to execution of a start-up program after the function expansion program has been completed by the CPU so that the operating system is started-up under a second condition, wherein in a case where the operating system is started-up after the CPU has returned to execution of the start-up program, the functional section can be subjected to be under control by the operating system or an application program operating on the operating system, and the predetermined control includes various controls other than initialization.

According to a third aspect of the present invention, there is provided a function addition method that adds a function to a computer provided with a CPU, comprising: a step in which a function expansion program stored in a program storage section is called, before a start-up program starts-up an operating system, by the start-up program executed at the start-up time of the computer and is executed by the CPU; and a step in which a functional section is subjected to a control by the function expansion program executed by the CPU, wherein the control includes a control other than initialization.

The above function addition method may further include a step in which the function expansion program executed by the CPU accesses to a peripheral equipment.

The above function addition method may further include a step in which the function expansion program executed by the CPU communicates with an external equipment through a network interface.

The above function addition method may further include a step in which a program other than the function expansion program controls the functional section.

The above function addition method may further include a step of preventing the CPU from returning to execution of the start-up program after the function expansion program has been completed by the CPU.

The above function addition method may further include a step of returning the CPU to execution of the start-up program after the function expansion program has been completed by the CPU.

The above function addition method may further include a step in which an operating system started-up after the CPU has returned to execution of the start-up program or an application program operating on the operating system controls the functional section.

The above function addition method may further include a step in which a sub-CPU provided in the functional section communicates with the CPU that executes the function expansion program.

In the above function addition method, the functional section may be a TV reception section, a radio reception section, or a data reception section.

In the above function addition method, the program storage section and functional section may be provided in a function expansion board that can be attached to a bus of the computer.

According a forth aspect of the present invention, there is provided a function addition method that adds a function to a computer provided with a CPU, comprising: a step in which a function expansion program stored in a program storage section is called, before a start-up program starts-up an operating system, by the start-up program executed at the start-up time of the computer and is executed by the CPU; and a step in which a functional section is subjected to a predetermined control by the function expansion program executed by the CPU; a step of preventing the CPU from returning to execution of the start-up program after the function expansion program has been completed by the CPU under a first condition; a step of returning the CPU to execution of the start-up program after the function expansion program has been completed by the CPU so that the operating system is started-up under a second condition; and a step in which, in a case where the operating system is started-up after the CPU has returned to execution of the start-up program, the functional section is subjected to a control by the operating system or an application program operating on the operating system, wherein the control includes a control other than initialization.

According to a fifth aspect of the present invention, there is provided a program that is called, before a start-up program starts-up an operating system, by the start-up program executed at the start-up time of a computer provided with a CPU and is executed by the CPU, the program performs a control of a functional section, wherein the control includes various controls other than initialization.

The above program may access to a peripheral equipment.

The above program may communicate with an external equipment through a network interface.

The above program may further include means for preventing the CPU from returning to execution of the start-up program after the program has been completed by the CPU.

The above program may farther include means for returning the CPU to execution of the start-up program after the program has been completed by the CPU.

In the above program, a sub-CPU provided in the functional section may communicate with the CPU that executes the program.

In the above program, the functional section may be a TV reception section, a radio reception section, or a data reception section.

In the above program, a storage medium that stores the program may be provided in a function expansion board that can be attached to a bus of the computer.

According to a sixth aspect of the present invention, there is provided a program that is called, before a start-up program starts-up an operating system, by the start-up program executed at the start-up time of a computer provided with a CPU and is executed by the CPU, the program performs a control of a functional section, comprising: means for preventing the CPU from returning to execution of a start-up program after the program has been completed by the CPU under a first condition; and means for returning the CPU to execution of a start-up program after the program has been completed by the CPU so that the operating system is started-up under a second condition, wherein the control includes a control other than initialization.

According to the present invention, the function addition apparatus includes a program storage section that stores a function expansion program, the function expansion program is called, before a start-up program starts-up an operating system, by the start-up program executed at the start-up time of the computer and executed by the CPU. Thus, it is possible to start-up an added function immediately after the computer has been powered on or reset.

BRIEF DESCRIPTION OF THE DRAWINGS

FIG. 2 is a block diagram showing a configuration of the TV reception section shown in FIG. 1;

FIG. 3 is a timing chart for explaining operation in the first mode in the embodiment of the present invention; and FIG. 4 is a timing chart for explaining operation in the second mode in the embodiment of the present invention.

DETAILED DESCRIPTION OF THE PREFERRED EMBODIMENTS

Figure 1:
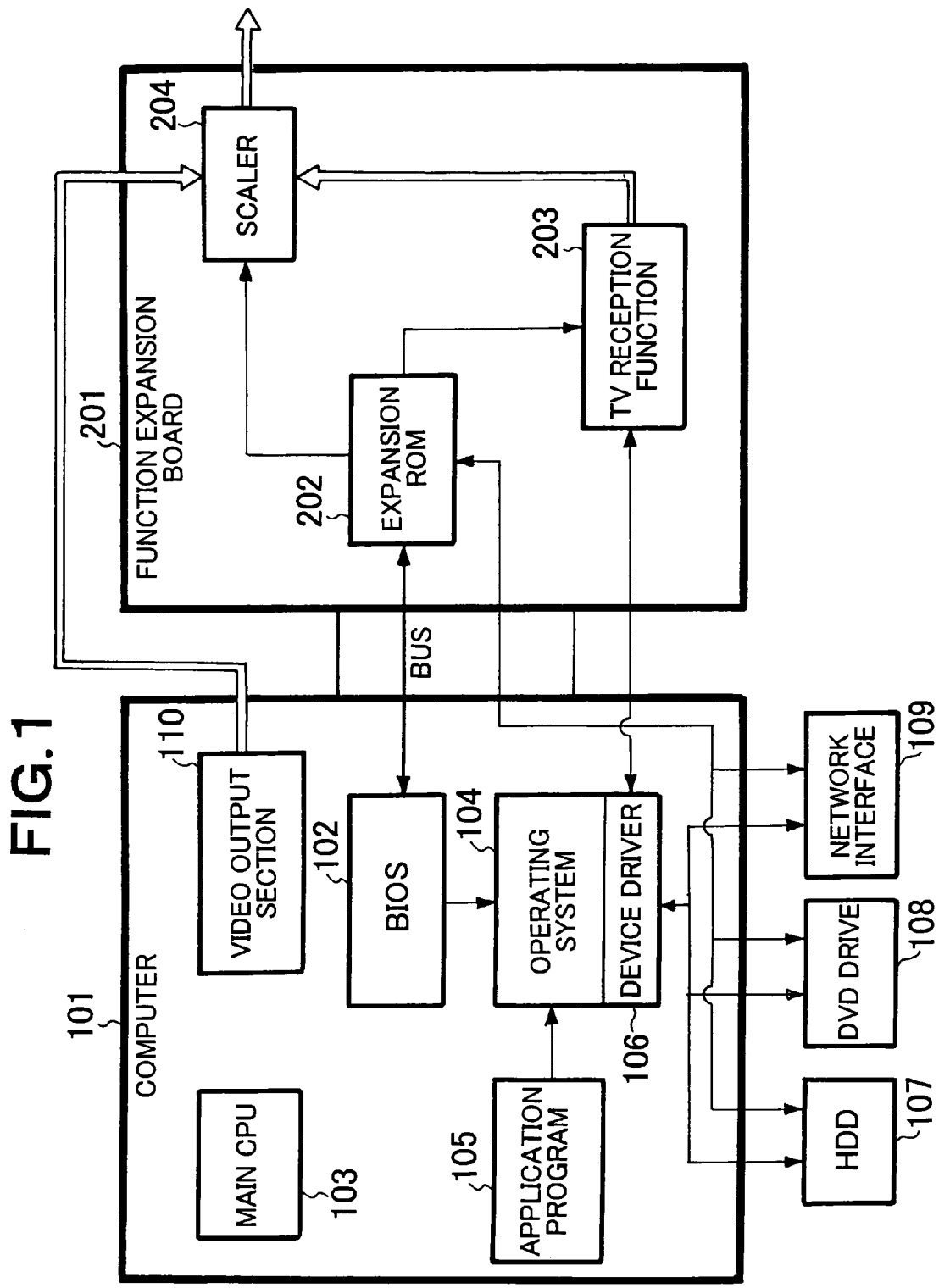
FIG. 1 is a block diagram showing a configuration of a computer and a function expansion board attached to the computer according to an embodiment of the present invention.

A preferred embodiment of the present invention will be described below with reference to the accompanying drawings.

FIG. 1 is a block diagram showing a configuration of a computer and a function expansion board attached to the computer according to an embodiment of the present invention.

Referring to FIG. 1, a BIOS 102 is executed by a main CPU 103 as a start-up program after a computer 101 has been powered on or reset. In a case where an extension board (function extension board 201 or the like) is attached to a bus and the extension board includes an expansion ROM 202, the BIOS 102 maps a function expansion program stored in the expansion ROM 202 to a predetermined address space to start the function expansion program. In a case where the computer 101 is in a predetermined mode, the BIOS 102 is executed by the main CPU 103 once again after the execution of the function expansion program stored in the expansion ROM has been completed. The BIOS 102 then starts an operating system 104.

Here, the expansion ROM 202 may any one of a masked ROM, a programmable ROM, such as an EEPROM. In addition, the expansion ROM 202 may be substituted by a RAM backed up by a battery, an FRAM, a hard disk drive or the like.

The operating system 104 performs various tasks such as management of a user interface, an application program, and a file.

An application program 105 is executed on the operating system 104.

The operating system 104 can access to a hard disk drive 107, a DVD drive 108, and a network interface 109 through a device driver 106. The application program 105 can access to the hard disk drive 107, DVD drive 108, and network interface 109 through the operating system 104 and device driver 106, or only through the device driver 106.

The operating system 104 can control a TV reception section 203 through the device driver 106. The application program 105 can control the TV reception section 203 through the operating system 104 and device driver 106, or only through the device driver 106.

The hard disk drive 107 can store various types of data and programs. In particular, with respect to the present invention, the hard disk drive 107 stores data of TV programs.

Similarly, in the DVD drive 108, various types of data and programs can be recorded onto a recording medium such as a DVD disc. In particular, with respect to the present invention, TV programs are recorded onto a recording medium in the DVD drive 108.

The network interface 109 is connected to a network such as the Internet or Intranet. Accordingly, TV programs can be stored in the hard disk drive which is connected to the network and a DVD disc in the DVD drive which is connected to the network.

As described above, the expansion ROM 202 incorporates the function expansion program to be started by the BIOS 102. The function expansion program is executed by the main CPU 103. Accordingly, the function expansion program can control various hardware resources of the computer 101 accessed from the main CPU 103. That is, the function expansion program can control the hard disk drive 107, DVD drive 108, network interface 109 and TV reception section 203.

The TV reception section 203 includes a TV reception function.

A scaler 204 outputs both or one of video data input thereto from a video output section 110 and video data input thereto from the TV reception section 203 to a monitor. When the scaler 204 outputs both video data, double screened data, picture-in-picture data, or data that has been subjected to alpha blending is created. The scaler 204 need not always be provided. In this case, the video data from the video output section 110 may be supplied to a first monitor, and the video data from the TV reception section 203 may be supplied to a second monitor.

FIG. 2 is a block diagram showing a configuration of the TV reception section 203 shown in FIG. 1.

Referring to FIG. 2, a sub-CPU 203-1 executes a program stored in a memory 203-3 and controls an interface 203-2 and a tuner 203-4.

The interface 203-2 communicates with the function expansion program stored in the expansion ROM 202 or device driver 106 through a bus 151.

The tuner 203-4 performs channel selection, volume control, and the like and supplies the scaler 204 and a speaker (not shown) with video data and voice, respectively, according to the control from the sub-CPU 203-1.

When the TV reception section 203 needs to be controlled while the function expansion program stored in the expansion ROM 202 is executed by the main CPU 103, or while the application program 105 or operating system 104 is executed by the main CPU 103, the function expansion program stored in the expansion ROM 202, application program 105, or operating system 104 issues an instruction for control to the sub-CPU 203-1. In accordance with the content of the instruction, the sub-CPU 203-1 controls the tuner 203-4 and the like. As a result, the function expansion program stored in the expansion ROM 202, application program 105, or operating system 104 can control the tuner 203-4.

Operation of the computer 101 to which the function expansion board 201 is attached will next be described.

There are two operation modes. In the first mode, the operating system 104 is not activated; whereas, in the second mode, the operating system 104 is activated.

Assume that two start-up buttons are provided in the computer 101 or remote-controller (not shown) and that the computer 101 operates in the first mode when a first start-up button is depressed and it operates in the second mode when a second start-up button is depressed. In this case, a flag indicating whether the computer 101 is operating in the first mode or second mode is stored in, e.g., a predetermined register so that the function expansion program stored in the expansion ROM 202 can refer to it.

Alternatively, a set of a start-up button and mode button may be provided in the computer 101 or remote-controller (not shown). In this case, the computer 101 operates in the first mode when the start-up button is depressed in a state where the mode button is set at a first position and it operates in the second mode when the start-up button is depressed in a state where the mode button is set at a second position.

FIG. 3 is a timing chart for explaining operation in the first mode.

Referring to FIG. 3, when the computer 101 is powered on or reset, the main CPU 103 executes a boot loader or a bootstrap in the BIOS 102 (step S301), which is a type of start-up program. At the same time, the sub-CPU 203-1 executes a program stored in the memory 203-3 to start initialization.

After a period of time, the sub-CPU 203-1 ends the initialization processing and enters an operation state (step S303). In this operation state, the sub-CPU 203-1 can receive an instruction from the main CPU 103.

After a period of time, the main CPU 103 that is executing the BIOS 102 finds the expansion ROM 202 and calls the function expansion program stored in the expansion ROM 202 and executes it (step S304).

Subsequently, the main CPU 103 that executes the function expansion program stored in the expansion ROM 202 and the sub-CPU 203-1 that executes a program stored in the memory 203-3 become communicable with each other.

Since being executed by the main CPU 103, the function expansion program stored in the expansion ROM 202 can access to resources in the computer 101. Accordingly, an infrared-ray reception section (not shown) can recognize an instruction issued from a remote-controller or a depression of a button (not shown). As described above, the function expansion program stored in the expansion ROM 202 can receive, from a user, various requests including a channel selection request, a volume control request, a scaler control request, and the like.

Upon receiving the channel selection request from a user (step S305), the function expansion program stored in the expansion ROM 202 instructs the sub-CPU 203-1 to perform channel selection (step S306). With this instruction, the tuner 203-4 selects the requested channel.

Similarly, upon receiving the volume control request from a user (step S307), the function expansion program stored in the expansion ROM 202 instructs the sub-CPU 203-1 to perform volume control (step S308). With this instruction, the tuner 203-4 controls volume.

Upon receiving the scaler control request from a user (step S309), the function expansion program stored in the expansion ROM 202 instructs the scaler 204 to perform scaler control (step S310). With this instruction, the scaler 204 is controlled. If the scaler 204 is provided with a sub-CPU as the TV reception section 203 is provided with its sub-CPU, or the scaler 204 is provided with a communication function, the scaler 204 can receive an instruction for the scaler control from the main CPU 103 and perform the scaler control according to the instruction. Alternatively, the function expansion program stored in the expansion ROM 202 may directly operate the register of the scaler 204 to perform the scaler control. Alternatively, the function expansion program stored in the expansion ROM 202 may perform the scaler control through the TV reception section 203.

Upon receiving an access request from a user for access to the hard disk drive 107 (step S311), the function expansion program stored in the expansion ROM 202 accesses to the hard disk drive 107 (step S312). This enables a TV program that is being received by the TV reception section 203 to be recorded on the hard disk drive.

Upon receiving an access request from a user for access to the DVD drive 108 (step S313), the function expansion program stored in the expansion ROM 202 accesses to the DVD drive 108 (step S314). This enables a TV program that is being received by the TV reception section 203 to be recorded on a DVD disc in the DVD drive 108.

Upon receiving an access request from a user for access to the network interface 109 (step S315), the function expansion program stored in the expansion ROM 202 accesses to the network interface 109 (step S316). This enables a TV program that is being received by the TV reception section 203 to be recorded on the hard disk drive or the like connected to the TV reception section 203 through a network.

The function expansion program stored in the expansion ROM 202 refers to a flag or switch indicating whether the computer 101 is in the first mode or second mode. When recognizing that the computer 101 is in the first mode, the function expansion program does not return the control to the BIOS 102, but continues executing the own function expansion program.

FIG. 4 is a timing chart for explaining operation in the second mode.

Steps S401 to S416 in FIG. 4 are equal to the steps S301 to S316 of FIG. 3, respectively, and description thereof will be omitted.

The function expansion program stored in the expansion ROM 202 refers to a flag or switch indicating whether the computer 101 is in the first mode or second mode. When recognizing that the computer 101 is in the second mode, the function expansion program returns the control to the BIOS 102 (step S417). At this time, however, the function expansion program returns to the BIOS 102 after a predetermined time for executing steps S405 to S416 has elapsed. This allows the function expansion program to respond to a user's request issued immediately after the start-up of the computer 101.

The main CPU 103 that is executing the BIOS 102 starts-up the operating system 104 according to an instruction in the BIOS 102 and starts the execution of the operating system 104 (step S418).

The main CPU 103 executes a predetermined initialization instruction of the operating system 104 (step S419) and enters an operation state (S420).

Upon receiving a channel selection request from a user (step S421), the operating system 104 or application program 105 instructs the sub-CPU 203-1 to perform channel selection through the device driver 106 (step S422). With this instruction, the tuner 203-4 selects a requested channel.

Similarly, upon receiving the volume control request from a user (step S423), the operating system 104 or application program 105 instructs the sub-CPU 203-1 to perform volume control through the device driver 106 (step S424). With this instruction, the tuner 203-4 controls volume.

Upon receiving the scaler control request from a user (step S425), the operating system 104 or application program 105 instructs the scaler 204 to perform scaler control (step S426). With this instruction, the scaler 204 is controlled. If the scaler 204 is provided with a sub-CPU as the TV reception section 203 is provided with its sub-CPU, or the scaler 204 is provided with a communication function, the scaler 204 can receive an instruction for the scaler control from the main CPU 103 and perform the scaler control according to the instruction. Alternatively, the operating system 104 or application program 105 may directly operate the register of the scaler 204 to perform the scaler control. Alternatively, the operating system 104 or application program 105 may perform the scaler control through the TV reception section 203.

Upon receiving an access request from a user for access to the hard disk drive 107 (step S427), the operating system 104 or application program 105 accesses to the hard disk drive 107 (step S428). This enables a TV program that is being received by the TV reception section 203 to be recorded on the hard disk drive.

Upon receiving an access request from a user for access to the DVD drive 108 (step S429), the operating system 104 or application program 105 accesses to the DVD drive 108 (step S430). This enables a TV program that is being received by the TV reception section 203 to be recorded on a DVD disc in the DVD drive 108.

Upon receiving an access request from a user for access to the network interface 109 (step S431), the function expansion program stored in the expansion ROM 202 accesses to the network interface 109 (step S432). This enables a TV program that is being received by the TV reception section 203 to be recorded on the hard disk drive or the like connected to the TV reception section 203 through a network.

Although the TV reception section 203 is taken as an example of a functional section in the above embodiment, a radio reception section, data reception section, or the like may be used as a functional section.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A function addition apparatus that adds a function to a computer provided with a first CPU, comprising:
   a functional section that comprises a second CPU, and
   a program storage section that stores a function expansion program, wherein said function expansion program is called, before a start-up program starts-up an operating system, by the start-up program executed at the start-up time of the computer and is executed by the first CPU; and wherein, when the computer and the function addition apparatus are in a condition such that the computer and the function addition apparatus can communicate each other, said first CPU issues instructions to said second CPU so that said functional section is controlled, whereby functions of said functional section are added to the computer.

2. The function addition apparatus according to claim 1, wherein
the function expansion program executed by the CPU not only controls the functional section but also accesses a peripheral equipment.

3. The function addition apparatus according to claim 1, wherein
the function expansion program executed by the CPU not only controls the functional section but also communicates with an external equipment through a network interface.

4. The function addition apparatus according to claim 1, wherein
the functional section can also be controlled by a program other than the function expansion program.

5. The function addition apparatus according to claim 1, further comprising means for preventing the CPU from returning to execution of a start-up program after the function expansion program has been completed by the CPU.

6. The function addition apparatus according to claim 1, further comprising means for returning the first CPU to execution of the start-up program after the function expansion program has been completed by the CPU.

7. The function addition apparatus according to claim 6, wherein
the functional section can also be controlled by an operating system started-up after the first CPU has returned to execution of the start-up program or by an application program operating on the operating system.

8. The function addition apparatus according to claim 1, wherein
the functional section includes a sub-CPU which communicates with the CPU that executes the function expansion program.

9. The function addition apparatus according to claim 1, wherein
the functional section is a TV reception section, a radio reception section, or a data reception section.

10. The function addition apparatus according to claim 1, wherein
the function addition apparatus is a function expansion board that can be attached to a bus of the computer.

11. A function addition method that adds a function to a computer provided with a first CPU, comprising:
a step in which a function expansion program stored in a program storage section is called, before a start-up program starts-up an operating system, by the start-up program executed at the start-up time of the computer and the function expansion program is executed by the first CPU; and
a step in which, when the computer and the function addition apparatus are in a condition such that the computer and the function addition apparatus can communicate each other, said first CPU issues instructions to a second CPU included in a functional section so that said functional section is controlled, whereby functions of said functional section are added to the computer.

12. The function addition method according to claim 11, further comprising a step in which the function expansion program executed by the CPU accesses to a peripheral equipment.

13. The function addition method according to claim 11, further comprising a step in which the function expansion program executed by the CPU communicates with an external equipment through a network interface.

14. The function addition method according to claim 11, further comprising a step in which a program other than the function expansion program controls the functional section.

15. The function addition method according to claim 11, further comprising a step of preventing the CPU from returning to execution of the start-up program after the function expansion program has been completed by the CPU.

16. The function addition method according to claim 11, further comprising a step of returning the first CPU to execution of the start-up program after the function expansion program has been completed by the first CPU.

17. The function addition method according to claim 16, further comprising a step in which an operating system started-up after the first CPU has returned to execution of the start-up program or an application program operating on the operating system controls the functional section.

18. The function addition method according to claim 11, further comprising a step in which a sub-CPU provided in the functional section communicates with the CPU that executes the function expansion program.

19. The function addition method according to claim 11, wherein
the functional section is a TV reception section, a radio reception section, or a data reception section.

20. The function addition method according to claim 11, wherein
the program storage section and functional section are provided in a function expansion board that can be attached to a bus of the computer.

* * * * *